(12) United States Patent
Tarighat Mehrabani et al.

(10) Patent No.: US 9,265,000 B2
(45) Date of Patent: Feb. 16, 2016

(54) WIRELESS COMMUNICATION DEVICE WITH THROUGHPUT ALLOCATION AND METHODS FOR USE THEREWITH

(71) Applicant: BROADCOM CORPORATION, Irvine, CA (US)

(72) Inventors: Alireza Tarighat Mehrabani, Irvine, CA (US); Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 228 days.

(21) Appl. No.: 14/032,582

(22) Filed: Sep. 20, 2013

(65) Prior Publication Data

US 2015/0071140 A1    Mar. 12, 2015

Related U.S. Application Data

(60) Provisional application No. 61/875,809, filed on Sep. 10, 2013.

(51) Int. Cl.
*H04W 52/02* (2009.01)
*H04W 88/00* (2009.01)

(52) U.S. Cl.
CPC .......... *H04W 52/0235* (2013.01); *H04W 88/00* (2013.01)

(58) Field of Classification Search
None
See application file for complete search history.

(56) References Cited

U.S. PATENT DOCUMENTS

2008/0212714 A1\* 9/2008 Varanasi et al. .............. 375/299
2014/0044041 A1\* 2/2014 Moshfeghi .................... 370/328

\* cited by examiner

*Primary Examiner* — Noel Beharry
*Assistant Examiner* — Rodrick Mak
(74) *Attorney, Agent, or Firm* — Garlick & Markison; Bruce E. Stuckman

(57) ABSTRACT

A wireless communication device with a plurality of transceivers analyzes a plurality of throughput profiles corresponding to the plurality of transceivers to determine a division of a total throughput into a plurality of individual throughputs corresponding to the plurality of transceivers. Data is transmitted to a remote communication device by allocating data for transmission among the plurality of transceivers based on the plurality of individual throughputs.

20 Claims, 6 Drawing Sheets

ABSTRACT# WIRELESS COMMUNICATION DEVICE WITH THROUGHPUT ALLOCATION AND METHODS FOR USE THEREWITH

CROSS-REFERENCE TO RELATED APPLICATIONS

The present U.S. Utility Patent Application claims priority pursuant to 35 U.S.C. §119(e) to U.S. Provisional Patent Application No. 61/875,809, entitled WIRELESS COMMUNICATION DEVICE WITH THROUGHPUT ALLOCATION AND METHODS FOR USE THEREWITH, filed Sep. 10, 2013, which is hereby incorporated herein by reference in its entirety and made part of the present U.S. Utility Patent Application for all purposes.

BACKGROUND

1. Technical Field

This various embodiments relate generally to communication devices and more particularly to the communication devices that include multiple transceivers that operate via different protocols or in different frequency bands.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the millimeter wave V-band of 55-64 GHz that includes 60 GHz communications such as Wireless-HD and Wireless Gigabit Alliance (WiGig).

BRIEF DESCRIPTION OF THE SEVERAL VIEWS OF THE DRAWING(S)

DETAILED DESCRIPTION

Figure 1:
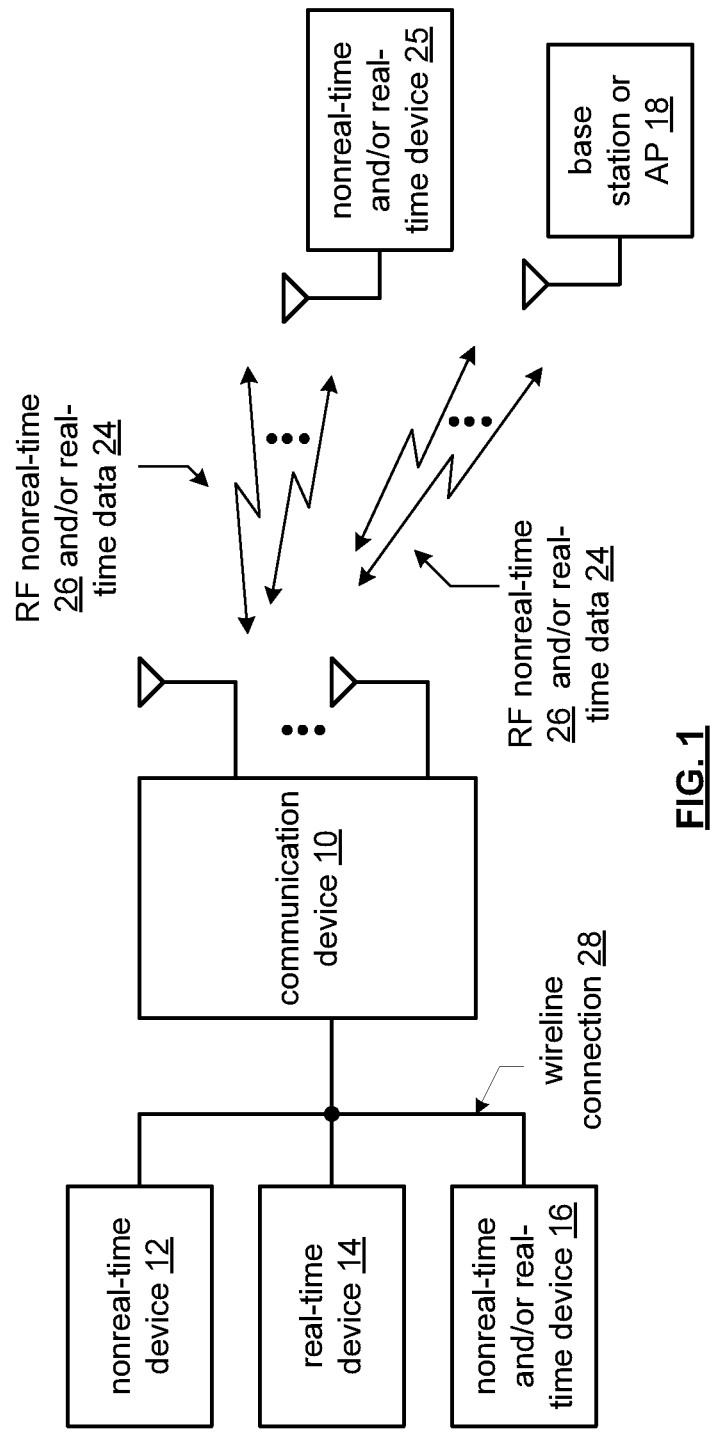
FIG. 1 is a schematic block diagram of an embodiment of a communication system.

FIG. 1 is a schematic block diagram of an embodiment of a communication system. In particular a communication system is shown that includes a communication device 10 that communicates real-time data 24 and/or non-real-time data 26 wirelessly with one or more other devices such as base station 18, non-real-time and/or real-time device 25. In addition, communication device 10 can also optionally communicate over a wireline connection with non-real-time device 12, real-time device 14 and non-real-time and/or real-time device 16.

In an embodiment, the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary.

The wireless connections can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), WCDMA, long term evolution (LTE) or other mobile wireless protocol or other wireless communication protocol, either standard or proprietary. Further, the wireless connections can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a smart phone, a personal digital assistant, game console, game device, personal computer, laptop computer, wireless display or other device that performs one or more functions that include communication of voice and/or data via wireline connection 28 and/or the wireless communication paths. In an embodiment, the real-time and/or non-real-time devices 25 can be base stations, access points, terminals, personal computers, laptops, PDAs, tablets, storage devices, cable replacements, bridge/hub devices, wireless HDMI devices, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment, communication device 10 includes a plurality of transceivers such as a Bluetooth transceiver, LTE transceiver, WLAN transceiver, WiGig transceiver and/or other transceiver that transceives in accordance with another wireless connection protocol. The communication device 10 operates by analyzing a plurality of throughput profiles corresponding to the plurality of transceivers to determine a division of a total throughput into a plurality of individual throughputs, wherein each individual throughput corresponds to one of the transceivers. The communication device 10 transmits data to a remote communication device, such as the base station or access point 18 or the non-real-time and/or real-time device 25 by allocating data for transmission among the plurality of transceivers based on the plurality of individual throughputs.

In an embodiment, the communication device 10 includes a circuit, such as an RF integrated circuit that includes one or more features or functions of various embodiments. Such circuits shall be described in greater detail, including several optional functions and features, in association with FIGS. 2-6 that follow.

Figure 2:
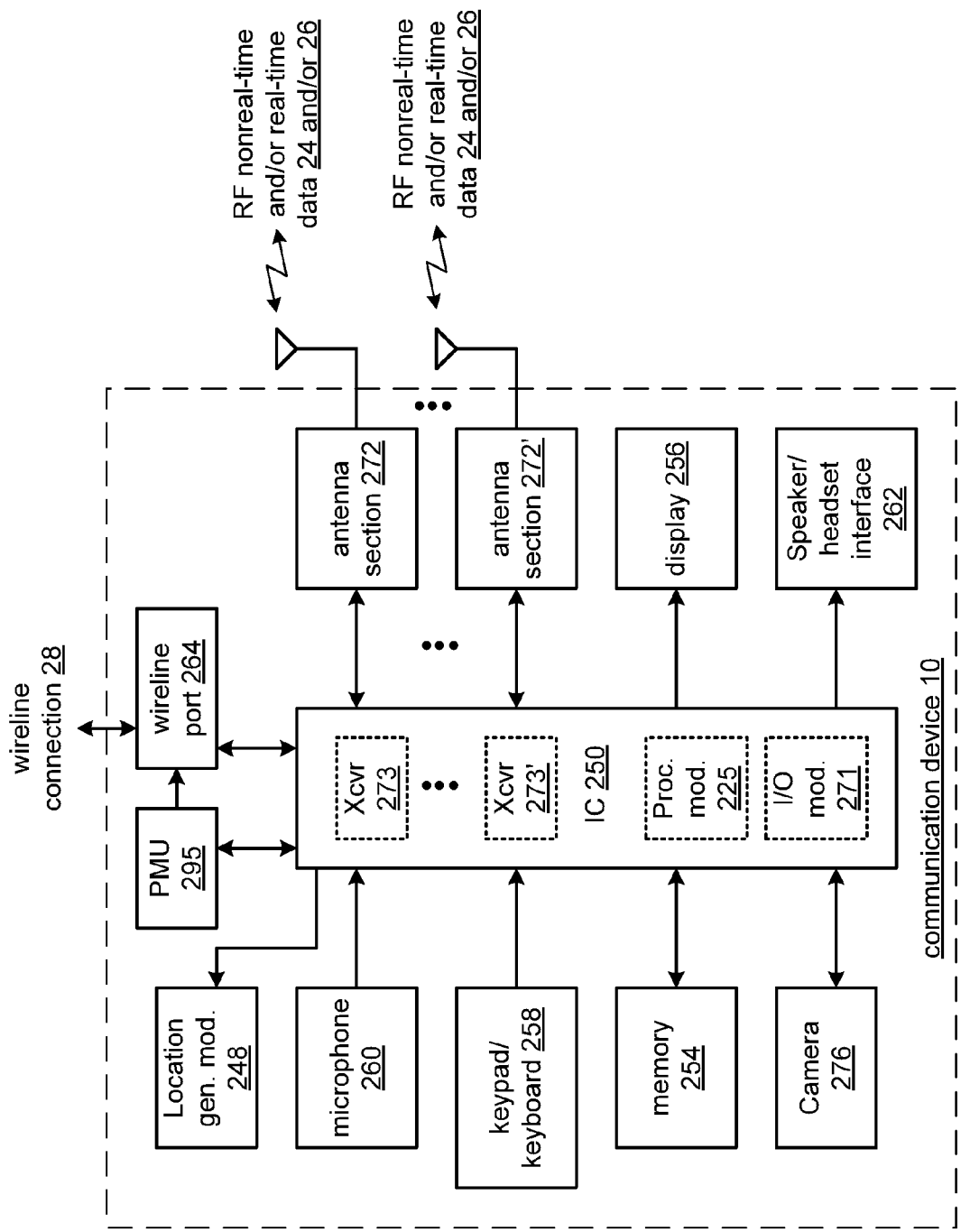
FIG. 2 is a schematic block diagram of an embodiment of a communication device 10.

FIG. 2 is a schematic block diagram of an embodiment of a communication device 10. In particular, integrated circuit (IC) 250 is shown that implements communication device 10 in conjunction with microphone 260, keypad/keyboard 258, memory 254, speaker/headset interface 262, display 256, camera 276, antenna sections 272 . . . 272', and wireline port 264. In operation, RF IC 250 includes a plurality of wireless transceivers such as transceivers 273, 273' . . . having RF and baseband modules for sending and receiving data such as RF real-time data 26 and non-real-time data 24 and transmitting via antenna sections 272 . . . 272'. Each antenna section 272 . . . 272' can include a fixed antenna, a single-input single-output (SISO) antenna, a multi-input multi-output (MIMO) antenna, a diversity antenna system, an antenna array that allows the beam shape, gain, polarization or other antenna parameters to be controlled or other antenna configuration. In addition, IC 250 includes input/output module 271 that includes the appropriate interfaces, drivers, encoders and decoders for communicating via the wireline connection 28 via wireline port 264, an optional memory interface for communicating with off-chip memory 254, a codec for encoding voice signals from microphone 260 into digital voice signals, a keypad/keyboard interface for generating data from keypad/keyboard 258 in response to the actions of a user, a display driver for driving display 256, such as by rendering a color video signal, text, graphics, or other display data, and an audio driver such as an audio amplifier for driving speaker 262 and one or more other interfaces, such as for interfacing with the camera 276 or the other peripheral devices.

Power management circuit (PMU) 295 includes one or more DC-DC converters, voltage regulators, current regulators or other power supplies for supplying the IC 250 and optionally the other components of communication device 10 and/or its peripheral devices with supply voltages and or currents (collectively power supply signals) that may be required to power these devices. Power management circuit 295 can operate from one or more batteries, line power, an inductive power received from a remote device, a piezoelectric source that generates power in response to motion of the integrated circuit and/or from other power sources, not shown. In particular, power management module 295 can selectively supply power supply signals of different voltages, currents or current limits or with adjustable voltages, currents or current limits in response to power mode signals received from the IC 250. While shown as an off-chip module, PMU 295 can be alternatively implemented as an on-chip circuit.

In addition, IC 250 may include an location generation module 248 that generates location or motion parameters based on the location or motion of the device such as a longitude, latitude, altitude, address, velocity, velocity vector, acceleration (including deceleration), and/or other location or motion parameter. Location generation module 248 can include a global positioning system (GPS) receiver, one or more accelerometers, gyroscopes or positioning sensors, a device that operates via triangulation data received via the network, or other location generation devices that generate or receive such location or motion parameters.

In an embodiment, the RF transceivers 273 . . . 273' form a combo radio that generate outbound RF signals from outbound data and generate inbound data from inbound RF signals to communicate contemporaneously with a remote communication device in accordance with a plurality of differing protocols such as Bluetooth, LTE, WLAN, WiGig and/or other wireless connection protocols. This combo radio design provides an opportunity for more energy-efficient transmission of bits across multiple concurrent radio paths. However, radio channels can exhibit very different current consumption efficiency profiles as a function of data-rate. Brute-force distribution of data rates across radios can be highly inefficient in terms of energy-per-bit. Further, switching ON/OFF a radio just based on peak data rate can yield suboptimal results. A more continuous bit allocation across the transceivers 273 . . . 273' can be more efficient.

In an embodiment, the processing module 225 analyzes a plurality of throughput profiles corresponding to the plurality of transceivers to determine a division of a total throughput into a plurality of individual throughputs, wherein each individual throughput corresponds to one of the transceivers. The RF transceivers 273 . . . 273' transmit data to a remote communication device, such as the base station or access point 18 or the non-real-time and/or real-time device 25 by allocating data for transmission among the plurality of transceivers based on the plurality of individual throughputs.

In an embodiment, the IC 250 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 254. Such a memory device may be a read-only memory, random access memory, volatile memory, non-volatile memory, static memory, dynamic memory, flash memory, and/or any device that stores digital information. Note that when the IC 250 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

Also note that while certain modules of communication device 10 are shown to be included on IC 250 while others are not, IC 250 is shown for illustrative purposes and may include more or less of the modules of communication device 10, depending on the particular implementation. Further, communication device 10 can include additional modules or fewer modules than those specifically shown. In operation, the IC 250 executes operational instructions that implement one or more of the applications (real-time or non-real-time) attributed to communication devices 10 as discussed above and in conjunction with FIG. 1.

Figure 3:
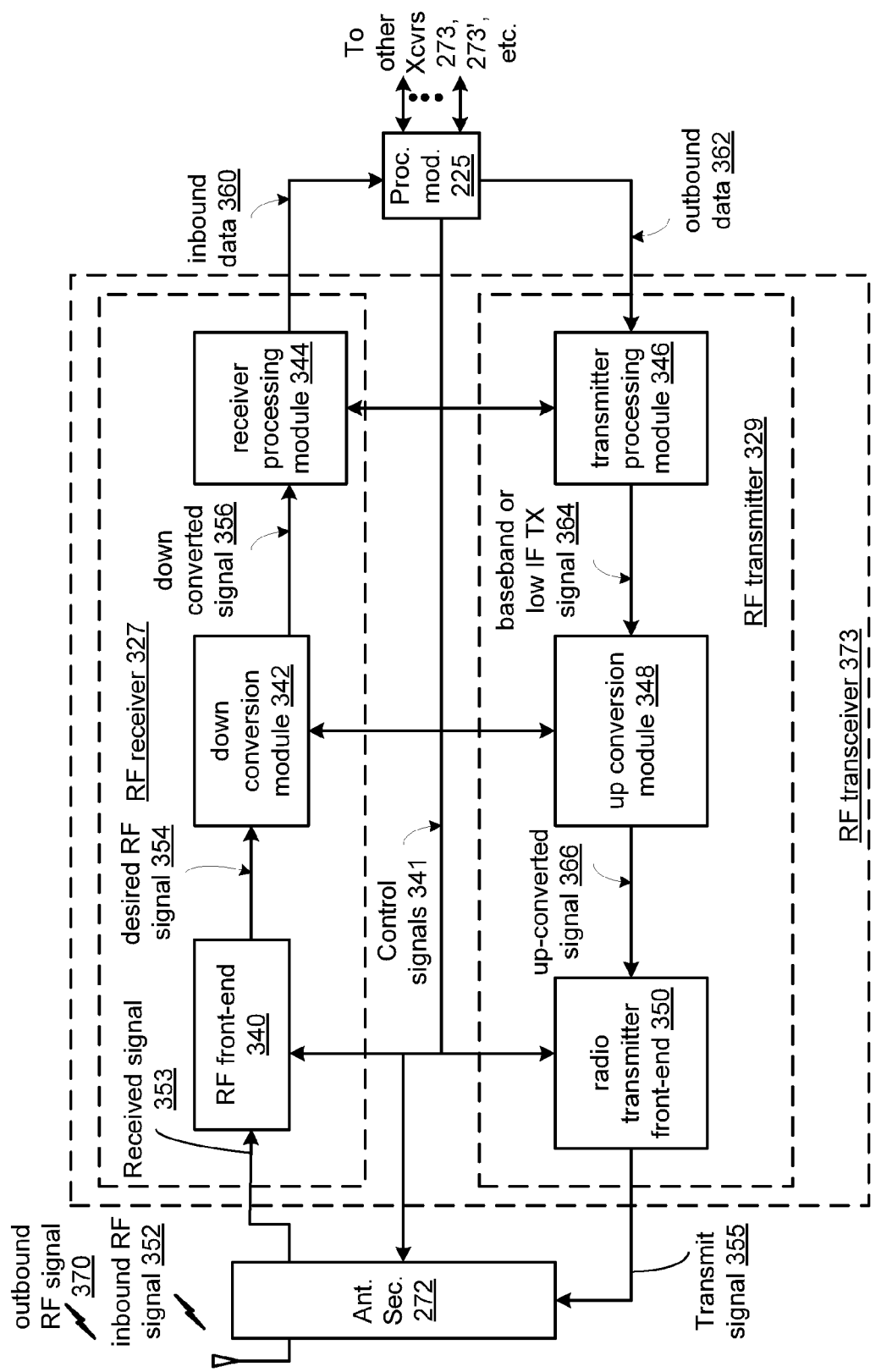
FIG. 3 is a schematic block diagram of an embodiment of an RF transceiver 373.

FIG. 3 is a schematic block diagram of an embodiment of RF transceiver 323. The RF transceiver 373, such as any of the RF transceivers 273 . . . 273', includes an RF transmitter 329, and an RF receiver 327. The RF receiver 327 includes a RF front end 340, a down conversion module 342 and a receiver baseband processing module 344 that operate under the control of control signals 341. The RF transmitter 329 includes a transmitter baseband processing module 346, an up conversion module 348, and a radio transmitter front-end 350 that also operate under control of control signals 341.

As shown, the receiver and transmitter are each coupled to an antenna section 272 (or conversely an antenna section 272') to produce outbound RF signal 370 and couples inbound signal 352 to produce received signal 353. The antenna section 272 can include a transmit/receive switch that operates under control of a control signal of control signals 241, duplexer or diplexer, impedance matching including a tunable impedance matching network that operates under control of control signals 241 and a single antenna or a plurality of antennas such as a multiple input multiple output (MIMO) antenna structure, diversity antenna structure, phased array that produces multiple beamforming patterns, multiple antenna polarizations or other radiation patterns based on control signals 241 or other controllable antenna structure that includes a plurality of antennas.

In operation, the RF transmitter 329 receives outbound data 362 allocated by processing module 225 to the transceiver 373 from other portions of its host device, such as a communication application executed by processing module 225 or other source via the transmitter processing module 346. The transmitter processing module 346 processes the outbound data 362 in accordance with a particular wireless communication standard (e.g., Bluetooth, WiGig, LTE, 802.11, et cetera) to produce baseband or low intermediate frequency (IF) transmit (TX) signals 364 that contain outbound data 362. The baseband or low IF TX signals 364 may be digital baseband signals (e.g., have a zero IF) or digital low IF signals, where the low IF typically will be in a frequency range of one hundred kilohertz to a few megahertz. Note that the processing performed by the transmitter processing module 346 can include, but is not limited to, scrambling, encoding, puncturing, mapping, modulation, and/or digital baseband to IF conversion.

The up conversion module 348 includes a digital-to-analog conversion (DAC) module, a filtering and/or gain module, and a mixing section. The DAC module converts the baseband or low IF TX signals 364 from the digital domain to the analog domain. The filtering and/or gain module filters and/or adjusts the gain of the analog signals prior to providing it to the mixing section. The mixing section converts the analog baseband or low IF signals into up-converted signals 366 based on a transmitter local oscillation.

The radio transmitter front end 350 includes a power amplifier and may also include a transmit filter module. The power amplifier amplifies the up-converted signals 366 to produce outbound RF signals 370, which may be filtered by the transmitter filter module, if included. The antenna section 272 transmits the outbound RF signals 370 to a remote communication device.

The receiver receives inbound RF signals 352 via the antenna section 272 as received signal 353 that coupled to the receiver front-end 340. The down conversion module 342 includes a mixing section, an analog to digital conversion (ADC) module, and may also include a filtering and/or gain module. The mixing section converts the desired RF signal 354 into a down converted signal 356 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 356. Note that the ordering of the ADC module and filtering and/or gain module may be switched, such that the filtering and/or gain module is an analog module.

The receiver processing module 344 processes the baseband or low IF signal 356 in accordance with a particular wireless communication standard (e.g., IEEE 802.11, Bluetooth, LTE, WiGig, RFID, GSM, CDMA, et cetera) to produce inbound data 360. The processing performed by the receiver processing module 344 includes, but is not limited to, digital intermediate frequency to baseband conversion, demodulation, demapping, depuncturing, decoding, and/or descrambling.

In operation, the processing module 225 is coupled to RF transceiver 373 and a plurality of other transceivers 273 . . . 273' that are each implemented by a similar RF transceiver 373. Data to be transmitted to a remote communication device is allocated by the processing module 225 among the RF transceiver 373 and the other transceivers 273 . . . 273' based on individual throughputs determined by the processing module 225 for each transceiver. In particular, the processing module 225 allocates the data for transmission to the remote communication device among the plurality of transceivers 273 . . . 273', based on an analysis of a plurality of throughput profiles corresponding to the plurality of transceivers and a division of a total throughput to a plurality of individual throughputs corresponding to the plurality of transceivers.

Consider the operation of processing module 225 in accordance with following example. Assume the processing module 225 is running an application that requests or requires a target throughput of T0. Assume four radio connections are available (R1, R2, R3, R4), via four different transceivers (radios) 273 . . . 273'. The processing module operates to divide the total throughput T0 into a plurality of four individual throughputs (T1, T2, T3, T4) corresponding, respectively to (R1, R2, R3, R4), such that $$T1+T2+T3+T4=T0$$

Each of the radio connections (R1, R2, R3, R4) can be described by a throughput profile, such as a throughput profile that characterizes a power parameter as a function of throughput, (e.g. power per unit of throughput). Representing the normalized P/throughput as nP for each radio channel, the four radios have four different profiles: nP1, nP2, nP3, and nP4. The power used by the ith radio, $P_i$, can be represented by:

$$P_i=T_i \times nPi$$

where Ti is the individual throughput of the ith radio. The total power used by all four radios can be represented by:

$$\text{Total Power}=(T1 \times nPi)+(T2 \times nPi)+(T3 \times nP3)+(T4 \times nP4)$$

The processing module 225 seeks to reduce the total power by determining a set of individual throughputs (T1, T2, T3, T4) that reduce the Total Power.

An optimization problem can be formulated as a minimization of Total Power over the set of possible (T1, T2, T3, T4), subject to the constraint (T1+T2+T3+T4=T0). The above optimization decides which radios are switched ON and their respective throughputs.

In an embodiment, the processing module 225 solves this optimization for (T1, T2, T3, T4) by iteratively evaluating sets of candidate individual throughputs (i.e. candidate values of (T1, T2, T3, T4)) based on a power required to implement each candidate set determined based on a review of the throughput profiles. In this fashion, the processing module 225 determines the plurality of individual throughputs by iteratively evaluating a set of candidate individual throughputs to reduce a total power used by the plurality of transceivers.

Consider the following optimization algorithm employed by processing module 225 in accordance with the example discussed above:
1. From the Four radios, select the one radio that can supply the total target T0 with lowest mW/bit/sec. Let's assume radio R2, is selected.
2. Start from rate distribution (0, T0, 0, 0), and calculate total power.
3. Evaluate an adjustment where a fraction D of total T0 is assigned to second best radio, e.g. R1,
4. Use (D, T0-D, 0, 0), calculate total power, if better performance, use the new set, if not, go back to previous set.
5. Repeat step 4 until the gradient of total power becomes flat.

While a particular optimization algorithm is presented above, other search algorithms can be employed, such as other gradient search algorithms, global search algorithms, exhaustive search algorithms, genetic algorithms, and other optimization methods could be likewise employed. While the example above uses two of the four radios to handle the total throughput, more or all of the radios can be employed. Said another way one or more of the individual throughputs can be determined to be zero—with the corresponding radio turned off if no throughput is required. In the converse, all of the radios can be used with all of the individual throughputs having nonzero values.

As previously discussed the processing module allocates the data to be transmitted to each of the transceivers 273 . . . 273' based on the individual throughputs. Considering the example discussed above, the data to be transmitted can be allocated to the plurality of transceivers as follows:
The portion of total data allocated to radio R1=T1/T0
The portion of total data allocated to radio R2=T2/T0
The portion of total data allocated to radio R3=T3/T0
The portion of total data allocated to radio R4=T4/T0

In addition, processing module 225 generates one or more control signals 341 to configure or adapt the RF transceiver 273 or 273' based on the particular communication protocol in use by RF transceiver 273 or 273' and the current parameters in use in accordance with that particular protocol in terms of frequency, frequency band, modulation, multiplexing, gain, power, antenna configuration, etc. The control signals 341 can be analog signals, digital signals, discrete-time signals or other signals that control the modules of RF transceiver 273 or 273' to adapt to communication and/or throughput requirements based on a throughput allocation from processing module 225.

In operation, processing module 225 generates the control signals 341 to modify the transmit and/or receiver parameters of the RF transceiver 273 or 273' such as protocol parameters, data rates, modulation types and other data parameters used by receiver processing module 344 and transmitter processing module 346, frequency bands, channels and bandwidths, filter settings, gains, power levels, ADC and DAC parameters, and other parameters used by RF front-end 340, radio transmitter front-end 350, down conversion module 342 and up conversion module 348, as well as antenna configurations used by antenna section 272 to set the beam pattern, gain, polarization or other antenna configuration of the antenna section 272. As will be discussed further in conjunction with FIG. 5, differing throughput profiles can be employed, not only for each transceiver but for each differing configuration of each transceiver.

Figure 4:
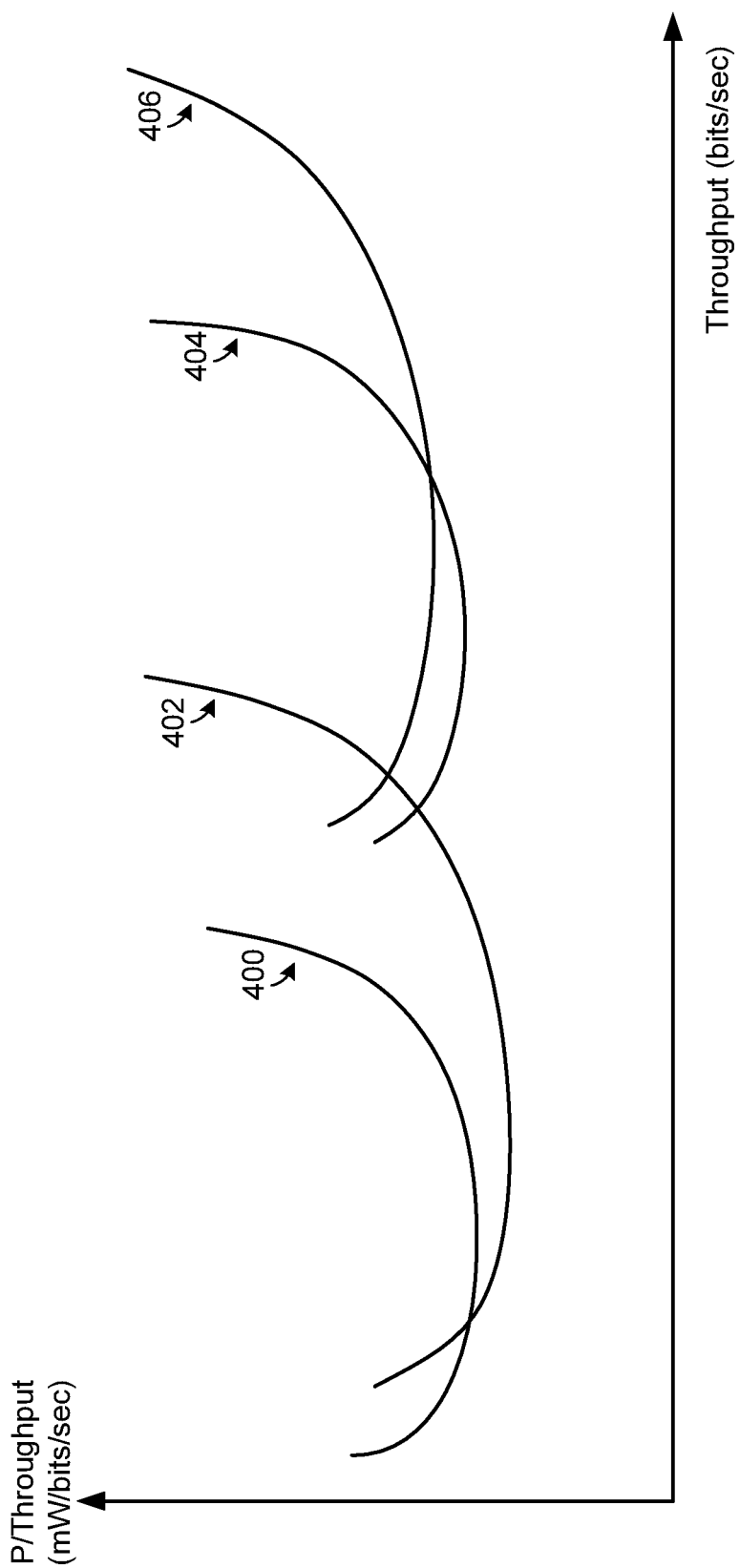
FIG. 4 is a graphical representation of an embodiment of a plurality of throughput profiles.

FIG. 4 is a graphical representation of an embodiment of a plurality of throughput profiles. In particular, a plurality of throughput profiles 400, 402, 404 and 406 that correspond to four different transceivers 273 . . . 273'. For example, the throughput profile 400 corresponds to a Bluetooth radio, throughput profile 402 corresponds to a LTE radio, the throughput profile 404 corresponds to an 802.11 radio and the throughput profile 406 corresponds to a WiGig radio. Each throughput profile represents a normalized power—in this case, power(in mW)/throughput(in bits/sec), shown graphically as a function of throughput (in bits/sec).

As discussed in conjunction with FIGS. 2-3, a processing module, such as processing module 225, performs an analysis of the plurality of throughput profiles of these transceivers to determine a division of a total throughput into a plurality of individual throughputs corresponding to each transceiver.

In an embodiment, the throughput profiles 400, 402, 404 and 406 are prestored in a look-up table or other memory associated with processing module 225 based on standard characteristics associated with each of the transceivers 273 . . . 273' corresponding to these profiles. As further discussed in conjunction with FIG. 3, an optimization or other search algorithm can be employed to determine the set of individual throughputs for each transceiver, based on a total throughput required or requested by a particular application executed by processing module 225.

In another embodiment, the processing module 225 is further configurable to measure the plurality of throughput profiles 400, 402, 404 and 406 corresponding to the plurality of transceivers based on actual channel conditions. For example, actual throughput measurements based on measurements of signal to noise ratio, signal to noise and interference ratio, bite error rate or packet error rates such as from feedback from a remote device and further based on actual transmission powers used in transmission to the remote device or other transmit and receive measurements and data used by the processing module 225 to model, estimate or otherwise construct the throughput profiles 400, 402, 404 and 406 corresponding to the plurality of transceivers.

Further, as channel conditions change or throughput requirements change, the processing module 225 adjusts the plurality of throughput profiles corresponding to the plurality of transceivers based on changes in the then current throughput measurements and the then current requests for throughput. The processing module 225 can respond to these changes in one or more of the throughput profiles and revise or otherwise adjust the individual throughputs used to allocate the data to the plurality of transceivers. In particular, an optimization or other search algorithm can be employed or re-employed to determine the set of individual throughputs for each transceiver, based on a total throughput required or requested by a particular application executed by processing module 225.

Figure 5:
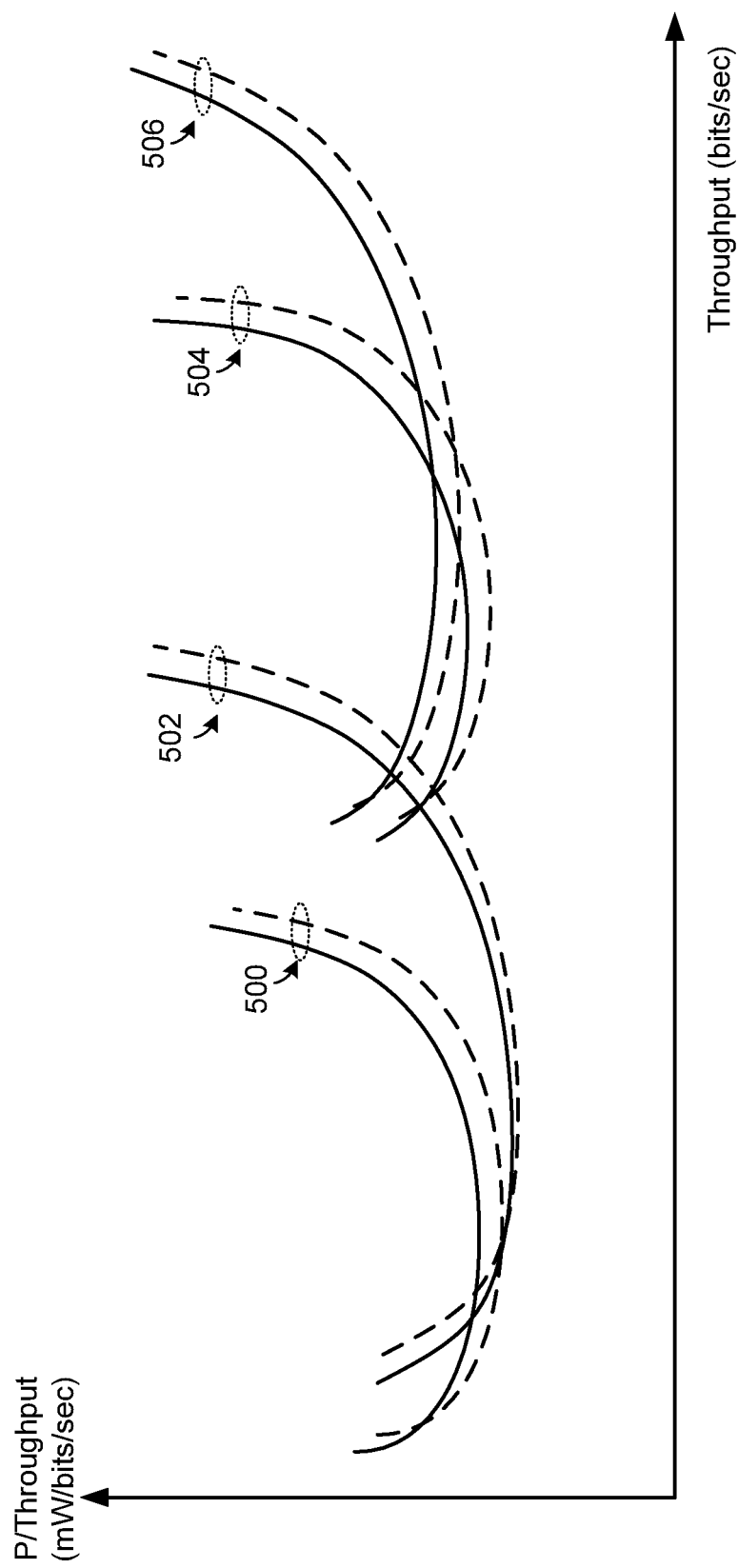
FIG. 5 is a graphical representation of another embodiment of a plurality of throughput profiles.

FIG. 5 is a graphical representation of another embodiment of a plurality of throughput profiles. In particular, a plurality of throughput profiles 500, 502, 504 and 506 that correspond to four different transceivers 273 . . . 273'. Each transceiver includes an antenna section, such as antenna section 272 or 272' configurable to two antenna configurations, and two throughput profiles are presented for each transceiver based on these two different antenna configurations. For example, the throughput profiles 500 correspond to a Bluetooth radio, throughput profiles 502 correspond to an LTE radio, the throughput profiles 504 correspond to an 802.11 radio and the throughput profiles 506 correspond to a WiGig radio. In operation, the processing module 225 operates to select both the individual throughput for each transceiver 273 . . . 273' and the particular antenna configuration for that transceiver.

As discussed in conjunction with FIG. 3, the two antenna configurations can correspond to at least two different transmission polarizations. More generally however, the processing module 225 can utilize many different throughput profiles corresponding to different antenna or other transmit configurations of the transceiver 273 . . . 273 including differing protocol parameters, data rates, modulation types, frequency bands, channels and bandwidths, filter settings, gains, power levels, ADC parameters, or other parameters as well as antenna configurations used by antenna section 272 to set the beam pattern, gain, polarization or other antenna configuration of the antenna section 272. Based on the particular configuration selected, the processing module 225 generates the control signals 341 to modify the transmit and/or receiver parameters of the RF transceiver 273 or 273' such as protocol parameters, data rates, modulation types and other data parameters used by receiver processing module 344 and transmitter processing module 346, frequency bands, channels and bandwidths, filter settings, gains, power levels, ADC and DAC parameters, and other parameters used by RF front-end 340, radio transmitter front-end 350, down conversion module 342 and up conversion module 348, as well as antenna configurations used by antenna section 272 to set the beam pattern, gain, polarization or other antenna configuration of the antenna section 272.

Figure 6:
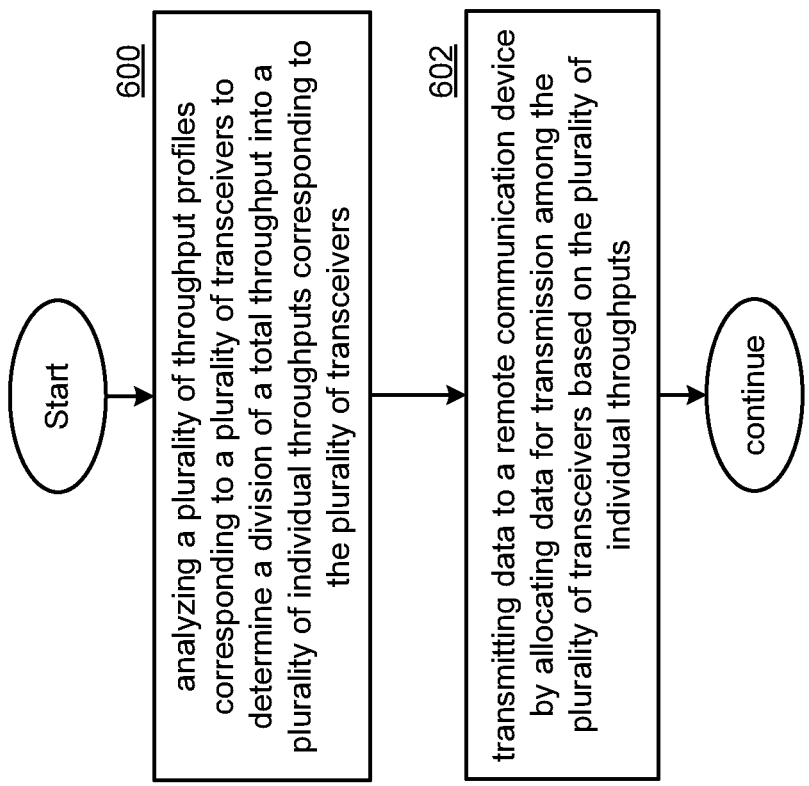
FIG. 6 is a flow chart of an embodiment of a method.

FIG. 6 is a flow chart of an embodiment of a method. In particular, a method is presented for use in conjunction with one or more of the functions and features described in conjunction with FIGS. 1-5. Step 600 includes analyzing a plurality of throughput profiles corresponding to a plurality of transceivers to determine a division of a total throughput into a plurality of individual throughputs corresponding to the plurality of transceivers. Step 602 includes transmitting data to a remote communication device by allocating data for transmission among the plurality of transceivers based on the plurality of individual throughputs.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A wireless communication device comprising:
   a plurality of transceivers configurable to wirelessly transceive data with a remote communication device in accordance with a plurality of network protocols; and
   a processing module, coupled to the plurality of transceivers, configurable to allocate the data for transmission to the remote communication device among the plurality of transceivers, based on an analysis of a plurality of throughput profiles corresponding to the plurality of transceivers and a division of a total throughput to a plurality of individual throughputs corresponding to the plurality of transceivers;
   wherein at least one of the plurality of transceivers includes an antenna section configurable to at least two antenna configurations corresponding to at least two different transmission polarizations and wherein the plurality of throughput profiles includes at least two throughput profiles for the at least one of the plurality of transceivers that correspond to the at least two antenna configurations; and
   wherein allocating the data for transmission to the remote communication device among the plurality of transceivers includes selecting one of the at least two antenna configurations for the at least one of the plurality of transceivers and wherein the processing module is further configurable to generate at least one control signal to control the antenna section in accordance with the selected one of the at least two antenna configurations.

2. The wireless communication device of claim 1 wherein the plurality of throughput profiles characterize a power parameter as a function of throughput.

3. The wireless communication device of claim 2 wherein the power parameter characterizes power per unit of the throughput.

4. The wireless communication device of claim 1 wherein the processing module determines the plurality of individual throughputs by iteratively evaluating a set of candidate individual throughputs based on a power required to implement the set of candidate individual throughputs.

5. The wireless communication device of claim 1 wherein the processing module determines the plurality of individual throughputs by iteratively evaluating a set of candidate individual throughputs to reduce a total power used by the plurality of transceivers.

6. The wireless communication device of claim 1 wherein the processing module is further configurable to measure the plurality of throughput profiles corresponding to the plurality of transceivers based on channel conditions.

7. The wireless communication device of claim 6 wherein the processing module is further configurable to adjust the plurality of throughput profiles corresponding to the plurality of transceivers based on changes in the channel conditions.

8. A wireless communication device comprising:
   a plurality of transceivers configurable to wirelessly transceive data with a remote communication device in accordance with a plurality of network protocols; and
   a processing module, coupled to the plurality of transceivers, configurable to allocate the data for transmission to the remote communication device among the plurality of transceivers, by iteratively evaluating candidate allocations of the data among the plurality of transceivers, wherein the candidate allocations include a division of a total throughput to a plurality of individual throughputs corresponding to the plurality of transceivers;
   wherein the processing module allocates the data for transmission to the remote communication device among the plurality of transceivers based on an analysis of a plurality of throughput profiles corresponding to the plurality of transceivers;
   wherein at least one of the plurality of transceivers includes an antenna section configurable to at least two antenna configurations corresponding to at least two different transmission polarizations and wherein the plurality of throughput profiles includes at least two throughput profiles for the at least one of the plurality of transceivers that correspond to the at least two antenna configurations; and
   wherein allocating the data for transmission to the remote communication device among the plurality of transceivers includes selecting one of the at least two antenna configurations for the at least one of the plurality of transceivers and wherein the processing module is further configurable to generate at least one control signal to control the antenna section in accordance with the selected one of the at least two antenna configurations.

9. The wireless communication device of claim 8 wherein the plurality of throughput profiles characterize a power parameter as a function of throughput.

10. The wireless communication device of claim 9 wherein the power parameter characterizes power per unit of the throughput.

11. The wireless communication device of claim 8 wherein the processing module is further configurable to measure the plurality of throughput profiles corresponding to the plurality of transceivers based on channel conditions.

12. The wireless communication device of claim 11 wherein the processing module is further configurable to adjust the plurality of throughput profiles corresponding to the plurality of transceivers based on changes in the channel conditions.

13. A method comprising:
   analyzing a plurality of throughput profiles corresponding to a plurality of transceivers to determine a division of a total throughput into a plurality of individual throughputs corresponding to the plurality of transceivers, wherein at least one of the plurality of transceivers includes an antenna section configurable to at least two antenna configurations corresponding to at least two different transmission polarizations and wherein the plurality of throughput profiles includes at least two throughput profiles for the at least one of the plurality of transceivers that correspond to the at least two antenna configurations; and
   transmitting data to a remote communication device by allocating data for transmission among the plurality of transceivers based on the plurality of individual throughputs, wherein allocating the data includes selecting one of the at least two antenna configurations for the at least one of the plurality of transceivers and generating at least one control signal to control the antenna section in accordance with the selected one of the at least two antenna configurations.

14. The method of claim 13 wherein the plurality of throughput profiles characterize a power parameter as a function of throughput.

15. The method of claim 14 wherein the power parameter characterizes power per unit of the throughput.

16. The method of claim 13 wherein the plurality of individual throughputs are determined by iteratively evaluating a set of candidate individual throughputs based on a power required to implement the set of candidate individual throughputs.

17. The method of claim 13 wherein the plurality of individual throughputs are determined by iteratively evaluating a set of candidate individual throughputs to reduce a total power used by the plurality of transceivers.

18. The method of claim 13 wherein the plurality of throughput profiles corresponding to the plurality of transceivers are determined based on channel conditions.

19. The method of claim 18 wherein the plurality of throughput profiles corresponding to the plurality of transceivers are adjusted based on changes in the channel conditions.

20. The method of claim 13 wherein the plurality of transceivers correspond to a single communication device.

* * * * *